(12) United States Patent
Uozumi et al.

(10) Patent No.: US 7,288,144 B2
(45) Date of Patent: Oct. 30, 2007

(54) NON-AQUEOUS INK-JET INK COMPOSITION

(76) Inventors: Shunsuke Uozumi, 1339-2, Wakaguri, Nishikanda, Ami-machi, Inashiki-gun, Ibaraki-ken (JP); Yasuo Yamamoto, 1339-2, Wakaguri, Nishikanda, Ami-machi, Inashiki-gun, Ibaraki-ken (JP)

( * ) Notice: Subject to any disclaimer, the term of this patent is extended or adjusted under 35 U.S.C. 154(b) by 294 days.

(21) Appl. No.: 11/101,769

(22) Filed: Apr. 8, 2005

(65) Prior Publication Data
US 2005/0223939 A1 Oct. 13, 2005

(30) Foreign Application Priority Data
Apr. 8, 2004 (JP) ............................. 2004-113836

(51) Int. Cl.
*C09D 11/02* (2006.01)
(52) U.S. Cl. ................. 106/31.6; 106/31.75; 106/31.86
(58) Field of Classification Search ............... 106/31.6, 106/31.75, 31.86
See application file for complete search history.

(56) References Cited

U.S. PATENT DOCUMENTS

| 4,990,185 | A  | * | 2/1991  | Krishnan ............... 106/31.86 |
| 6,281,268 | B1 | * | 8/2001  | Romano et al. ............. 523/160 |
| 6,425,948 | B1 | * | 7/2002  | Nowak et al. ............ 106/31.15 |
| 6,503,965 | B1 | * | 1/2003  | Nowak et al. .............. 523/161 |
| 2002/0188038 | A1 | * | 12/2002 | McJunkins et al. ......... 523/160 |
| 2003/0203987 | A1 | * | 10/2003 | Nomoto et al. ............. 523/160 |
| 2005/0039631 | A1 | * | 2/2005  | Best et al. ................. 106/31.6 |
| 2005/0075421 | A1 | * | 4/2005  | Yatake ...................... 523/179 |
| 2005/0140763 | A1 | * | 6/2005  | Jackson ..................... 347/100 |
| 2005/0193921 | A1 | * | 9/2005  | Ueki ....................... 106/31.43 |
| 2006/0098066 | A1 | * | 5/2006  | Bauer ........................ 347/100 |

FOREIGN PATENT DOCUMENTS

JP        8337747        12/1996

* cited by examiner

*Primary Examiner*—Helene Klemanski
(74) *Attorney, Agent, or Firm*—Frommer Lawrence & Haug LLP; Matthew K. Ryan, Esq.

(57) ABSTRACT

A non-aqueous ink-jet ink composition contains at least a pigment, a solvent, and a dispersing agent. The non-aqueous ink-jet ink composition further contains a chelating agent, which is soluble in the solvent. The chelating agent may be a crown ether and/or a cryptand, which acts as a neutral carrier. Alternatively, the chelating agent may be at least one chelating agent acting as an ionic carrier, which is selected from the group consisting of GEDTA, BAPTA, and DTPA. The non-aqueous ink-jet ink composition has good storage stability and good jetting-out performance through suppression of occurrence of sediments due to a change with the passage of time.

1 Claim, No Drawings

NON-AQUEOUS INK-JET INK COMPOSITION

BACKGROUND OF THE INVENTION

1. Field of the Invention

This invention relates to a non-aqueous ink-jet ink composition for use in a printer for recording information. This invention particularly relates to a non-aqueous ink-jet ink composition containing a non-volatile solvent as a principal constituent.

2. Description of the Related Art

Ink jet recording techniques enable low-noise, quick printing to be performed and have rapidly become popular in recent years. With ink jet printers, liquid ink compositions having a high fluidity are jetted out from fine nozzles, and information is thereby recorded on recording paper. The ink jet printers may be roughly classified into on-demand jetting-out types and continuous jetting-out types.

The ink compositions for use in the ink jet recording techniques may be roughly classified into aqueous types of ink compositions and non-aqueous types of ink compositions. Ordinarily, the aqueous types of the ink compositions contain water-soluble dyes, such as acid dyes, direct dyes, or basic dyes, which have been dissolved in a glycol type of solvent and water. However, ordinarily, the problems are encountered in that recorded matter obtained with the ink jet recording techniques, in which the aqueous types of the ink compositions are employed, have a low water resistance.

The non-aqueous types of the ink compositions have the advantages in that the non-aqueous types of the ink compositions are capable of yielding recorded matter having a high water resistance. The non-aqueous types of the ink compositions may be classified into solvent types of ink compositions, which contain volatile solvents as principal constituents, and oil types of ink compositions, which contain non-volatile solvents as principal constituents. In particular, with the oil types of the ink compositions, nozzle clogging is not apt to occur, and a frequency of a cleaning operation during the printing operation is capable of being kept low. Therefore, the oil types of the ink compositions are appropriated for use in quick ink jet printers, and a wide variety of kinds of ink compositions have heretofore been proposed as the oil types of the ink compositions.

A high storage stability is required of the ink compositions, such as the aqueous types of the ink compositions and the non-aqueous types of the ink compositions. If the storage stability of the ink compositions is insufficient, the ink jetting-out operation will become unstable. As a result, problems with regard to a lack of an image region in the formed image, blotting of the formed image, or insufficiency in image density (particularly, occurrence of a solid image region) will occur.

As an aqueous ink composition having a storage stability and a jetting-out stability, an ink composition, which contains an inorganic sulfate for rendering a polyvalent metal soluble in water, has been proposed in, for example, Japanese Unexamined Patent Publication No. 8(1996)-337747. In cases where an anion of a carboxylic acid, or the like, which originates from an additive, or the like, undergoes coordination with a metal ion contained in a member and forms a complex having a low solubility, the problems occur in that the solubility of the metal ion becomes low, and the ink jetting-out performance becomes bad. The proposed aqueous ink composition aims at suppressing the occurrence of the problems described above with an effect of a sulfate ion having a high degree of dissociation, which sulfate ion captures the metal ion, and thereby keeping good jetting-out stability.

A non-aqueous ink composition having the storage stability has been proposed in, for example, Japanese Unexamined Patent Publication No. 2003-261808. The proposed non-aqueous ink composition contains a dispersing agent, which has an ester structure, and an ink solvent, an at least 60% by weight portion of the ink solvent being constituted of a polar organic solvent, an at least 10% by weight portion of the polar organic solvent being constituted of an ester type of solvent. Through the setting of the proportion of the polar organic solvent to be at least 60% by weight with respect to the total solvent, and through the specific selection of the ester type of the solvent and the dispersing agent having the ester structure, which solvent and the dispersing agent have good compatibility, the proposed non-aqueous ink composition aims at improving the solubility of the dispersing agent in the ink composition and suppressing pigment aggregation.

However, even though the solubility of the dispersing agent is stabilized, and the pigment aggregation is suppressed, the problems are encountered with the non-aqueous ink compositions in that sediments, such as a pigment precipitate, a gel-like foreign substance, and a rod-like crystal, occur due to a change with the passage of time. If the sediments occur, clogging of a nozzle and an ink supplying path will occur, and the ink jetting-out stability will become bad. As one of factors for the occurrence of the sediments, formation of a salt by the solvent, which has been oxidized with the passage of time, and a typical metallic element ion may be mentioned.

The typical metallic element ion originates from pigments, pigment derivatives, impurities contained at the time of pigment synthesis, a vessel, and an ink path (a tube). In particular, in the cases of the non-aqueous ink compositions, since water is not present in the system, the typical metallic element ion separates out more readily than in the cases of the aqueous ink compositions. Also, after the typical metallic element ion has separated out, the typical metallic element ion having separated out is not capable of being easily rendered soluble again. However, the technique described in, for example, Japanese Unexamined Patent Publication No. 8(1996)-337747, for capturing the metal ion having dissolved is not capable of being employed for the non-aqueous ink compositions, in which water for dissolving the ion having captured the metal ion is not present.

Therefore, as techniques for suppressing the occurrence of the sediments in the non-aqueous ink compositions, various techniques described below have heretofore been employed. For example, with one technique, the amount of a pigment treating agent is set to be large such that the typical metallic element ion may not be liberated from the pigments. With a different technique, pigments having been highly purified are utilized. With a further different technique, solvents, with which little dissolution of the typical metallic element ion from the vessel or the ink path occurs, are utilized. With another technique, in expectation of the occurrence of the sediments, the structure of the vessel for accommodating the ink composition is set such that a last portion of the ink composition is left unused for the recording operation.

However, with the technique for limiting the kinds of the pigments used or with the technique for utilizing the pigments having been highly purified, the cost of the raw materials is not capable of being kept low, and the cost of the non-aqueous ink compositions is not capable of being kept low. With the technique for utilizing the solvents, with which little dissolution of the typical metallic element ion from the vessel or the ink path occurs, the kinds of the solvents capable of being utilized are limited. Also, even though the solvents, with which little dissolution of the typical metallic element ion from the vessel or the ink path occurs, are utilized, the dissolution of the typical metallic element ion due to a change with the passage of time is not capable of being prevented from occurring. With the technique for setting the structure of the vessel for accommodating the ink composition such that the last portion of the ink composition is left unused for the recording operation, operations for recovering and scrapping the residual ink composition are required, and the use of the vessel having the specific structure causes the cost to become high.

SUMMARY OF THE INVENTION

The primary object of the present invention is to provide a non-aqueous ink-jet ink composition, which has good storage stability (can-stability) and good jetting-out performance, and in which occurrence of sediments due to a change with the passage of time is suppressed.

The present invention provides a non-aqueous ink-jet ink composition, which contains at least a pigment, a solvent, and a dispersing agent, wherein the non-aqueous ink-jet ink composition further contains a chelating agent, which is soluble in the solvent.

The term "soluble in a solvent" as used herein means that the chelating agent is soluble in the solvent to an extent such that the chelating agent is capable of capturing a typical metallic element ion, which has dissolved into the non-aqueous ink-jet ink composition.

The chelating agent should preferably be a crown ether and/or a cryptand, which acts as a neutral carrier.

Also, the chelating agent may be at least one compound selected from the group consisting of GEDTA, which may be represented by the formula:

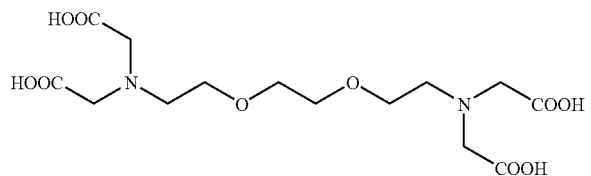

BAPTA, which may be represented by the formula:

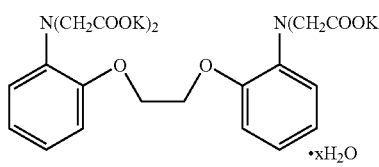

and DTPA, which may be represented by the formula:

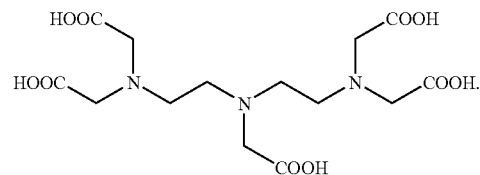

The non-aqueous ink-jet ink composition in accordance with the present invention contains at least the pigment, the solvent, and the dispersing agent. The non-aqueous ink-jet ink composition in accordance with the present invention further contains the chelating agent, which is soluble in the solvent. Therefore, with the non-aqueous ink-jet ink composition in accordance with the present invention, the chelating agent is capable of capturing the typical metallic element ion, which originates from pigments, pigment derivatives, impurities contained at the time of pigment synthesis, the vessel, and the ink path. Also, the chelating agent having captured the typical metallic element ion (i.e., a typical metallic element ion chelate) constitutes a solvate together with the typical metallic element ion. Therefore, the problems do not occur in that the typical metallic element ion separates out into the ink composition. Accordingly, the occurrence of sediments with the passage of time is capable of being suppressed. As a result, the non-aqueous ink-jet ink composition in accordance with the present invention is capable of having good storage stability and good jetting-out performance.

Also, with the non-aqueous ink-jet ink composition in accordance with the present invention, it is not necessary that the kinds of the pigments used are limited as in the conventional technique. Further, with the non-aqueous ink-jet ink composition in accordance with the present invention, it is not necessary that the pigments having been highly purified are utilized as in the conventional technique. Furthermore, with the non-aqueous ink-jet ink composition in accordance with the present invention, it is not necessary that the solvents, with which little dissolution of the typical metallic element ion from the vessel or the ink path occurs, are utilized as in the conventional technique. Also, with the non-aqueous ink-jet ink composition in accordance with the present invention, it is not necessary that the structure of the ink vessel is set at a specific structure such that the last portion of the ink composition is left unused for the recording operation. Therefore, the non-aqueous ink-jet ink composition in accordance with the present invention is advantageous for reasons of economy.

In the cases of the non-aqueous ink composition, in order for the occurrence of deposits originating from the typical metallic element ion due to a change with the passage of time to be suppressed, it is important that the typical metallic element ion chelate having been formed becomes soluble in the non-aqueous ink composition and remains stable in the soluble state. The chelating agent soluble in the solvent, particularly the crown ether and/or the cryptand, has the characteristics such that the typical metallic element ion chelate becomes soluble in the non-aqueous ink composition and remains markedly stable in the soluble state. Therefore, with the chelating agent soluble in the solvent, particularly the crown ether and/or the cryptand, the occurrence of deposits originating from the typical metallic element ion due to a change with the passage of time is capable of being suppressed efficiently.

Also, the crown ether and/or the cryptand suffers from little change in structure before the crown ether and/or the cryptand captures the typical metallic element ion and after the crown ether and/or the cryptand has captured the typical metallic element ion. Therefore, the crown ether and/or the cryptand is advantageous from the view point of entropy. Accordingly, the crown ether and/or the cryptand is capable of capturing the typical metallic element ion markedly strongly.

DETAILED DESCRIPTION OF THE INVENTION

The non-aqueous ink-jet ink composition in accordance with the present invention contains at least the pigment, the solvent, and the dispersing agent. The non-aqueous ink-jet ink composition in accordance with the present invention further contains the chelating agent, which is soluble in the solvent.

Examples of the preferable chelating agents include the crown ethers and the cryptands, which act as the neutral carriers. Specifically, examples of the preferable chelating agents include the crown ethers and the derivatives thereof, such as those described below.

12-Crown-4-ether (1,4,7,10-tetraoxacyclododecane), which may be represented by the formula:

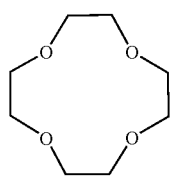

15-Crown-5-ether (1,4,7,10,13-pentaoxacyclopentadecane), which may be represented by the formula:

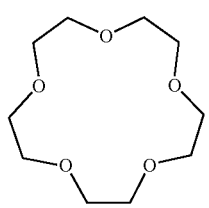

18-Crown-6-ether (1,4,7,10,13,16-hexaoxacyclooctadecane), which may be represented by the formula:

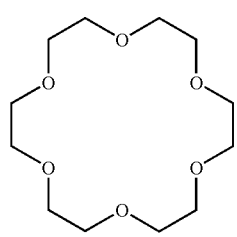

21-Crown-7-ether (1,4,7,10,13,16,19-heptaoxacycloheneicosadecane), which may be represented by the formula:

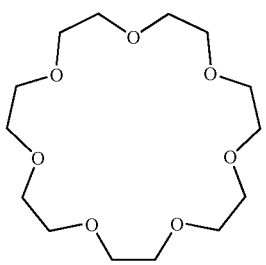

24-Crown-8-ether (1,4,7,10,13,16,19,22-octaoxacyclotetraeicosadecane), which may be represented by the formula:

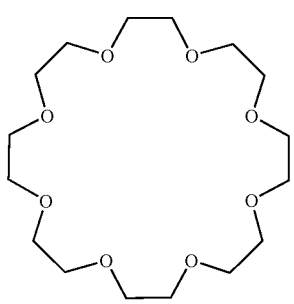

Also, examples of the preferable chelating agents include the aza-crown ethers, which are obtained from substitution of oxygen by nitrogen, and the derivatives thereof, such as those described below.

1,4,7,10,13-Pentaazacyclopentadecane, which may be represented by the formula:

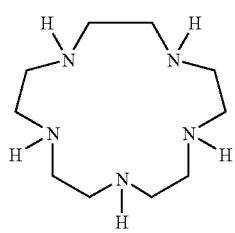

1,4,7,10,13, 16-Hexaazacyclooctadecane, which may be represented by the formula:

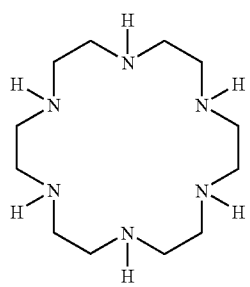

1-Aza-12-crown-4-ether (1,4,7-trioxa-10-azacyclododecane), which maybe represented by the formula:

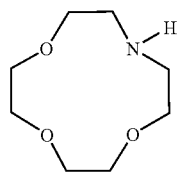

4,10-Diaza-12-crown-4-ether (1,7-dioxa-4,10-diazacyclododecane), which may be represented by the formula:

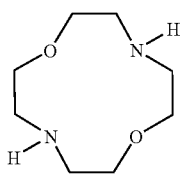

4,10-Diaza-15-crown-5-ether(1,4,10-trioxa-7,13-diazacyclopentadecane), which may be represented by the formula:

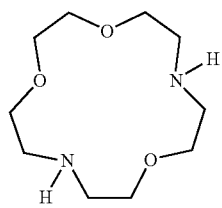

4,13-Diaza-18-crown-6-ether(1,4,10,13-tetraoxa-7,16-diazacyclooctadecane), which may be represented by the formula:

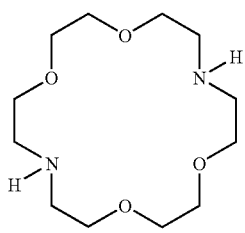

Further, examples of the preferable chelating agents include the thia-crown ethers, which are obtained from substitution of oxygen by sulfur, and the derivatives thereof, such as those described below.

1,4,7,10-Tetrathiacyclododecane, which may be represented by the formula:

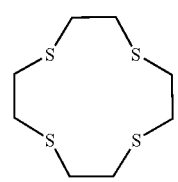

1,4,7, 10,13-Pentathiacyclopentadecane, which may be represented by the formula:

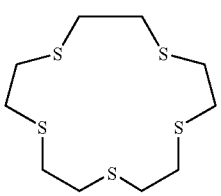

1,4,7,10,13,16-Hexathiacyclooctadecane, which may be represented by the formula:

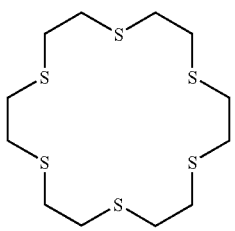

Furthermore, examples of the preferable chelating agents include the cryptands and the derivatives thereof, such as those described below.

Cryptand [2.2.2] (4,7,13,16,21,24-hexaoxa-1, 10-diazacyclo[8.8.8]hexacosane, which may be represented by the formula:

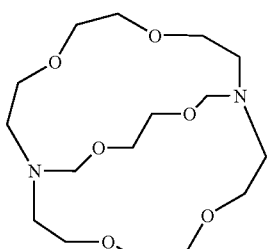

Cryptand [2.2.1] (4,7,13,16,21-pentaoxa-1,10-diazabicyclo[8.8.5]tricosane, which may be represented by the formula:

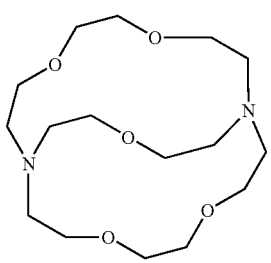

Each of the crown ethers and the cryptands enumerated above may be used alone. Alternatively, two or more of the crown ethers and the cryptands enumerated above may be used in combination.

Crown ether derivatives and crypt and derivatives, into which a group having a high affinity with an organic solvent, such as a benzo group, has been introduced, are more preferable for their characteristics such that the typical metallic element ion chelate becomes soluble in the non-aqueous ink composition and remains markedly stable in the soluble state. Examples of the crown ether derivatives and cryptand derivatives described above include dibenzo-18-crown-6-ether and tribenzo-18-crown-6-ether.

The crown ether and the cryptand are capable of taking alkali metals, such as Na and K, and alkaline earth metals, such as Ba, Ca, and Sr, into the holes. In cases where the sizes of the metals are large with respect to the sizes of the holes, the crown ether and the cryptand are capable of forming a sandwich structure. In this manner, the crown ether and the cryptand are capable of undergoing solvation. Particularly, in the cases of the non-aqueous ink composition, in order for the occurrence of deposits originating from the typical metallic element ion due to a change with the passage of time to be suppressed, it is important that the typical metallic element ion chelate having been formed becomes soluble in the non-aqueous ink composition and remains stable in the soluble state. The crown ether and the cryptand have the characteristics such that the typical metallic element ion chelate becomes soluble in the non-aqueous ink composition and remains markedly stable in the soluble state. Therefore, the crown ether and the cryptand are capable of capturing the typical metallic element ion, which originates from pigments, pigment derivatives, impurities contained at the time of pigment synthesis, the vessel, and the ink path, and thereby suppressing the occurrence of sediments.

Since the non-aqueous ink-jet ink composition in accordance with the present invention is of the non-aqueous type, the neutral carrier, such as the crown ether or the cryptand, is more preferable as the chelating agent than the ionic carrier. However, the ionic carrier soluble even slightly in the solvent has a sufficient effect of capturing the typical metallic element ion, which may be present in a small amount. Examples of the chelating agents, which act as the ionic carriers, include those described below.

GEDTA (referred to also as EGTA) (i.e., glycol ether diamine tetraacetic acid, or O,O'-bis(2-aminoethyl) ethyleneglycol-N,N,N',N'-tetraacetic acid), which may be represented by the formula:

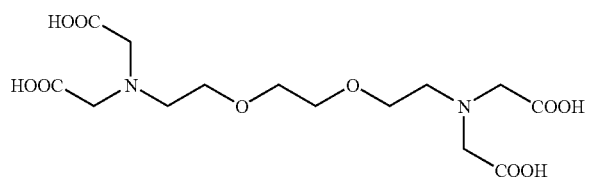

BAPTA (i.e., O,O'-bis(2-aminophenyl) Ethyleneglycol-N,N,N',N'-tetraacetic acid, tetrapotassium salt, hydrate), which may be represented by the formula:

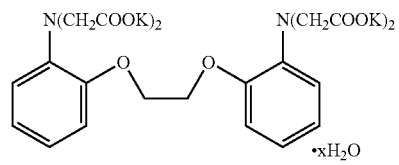

DTPA (i.e., diethylenetriamine-N,N,N',N'',N''-pentaacetic acid), which may be represented by the formula:

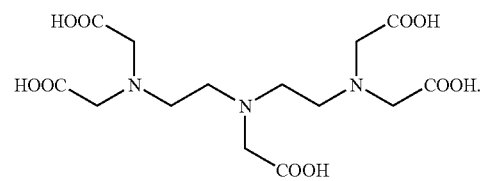

GEDTA, BAPTA, and DTPA may be used alone. Alternatively, two or more of GEDTA, BAPTA, and DTPA may be used in combination. As another alternative, the crown ether and/or the cryptand, which acts as the neutral carrier, and at least one ionic carrier, which is selected from the group consisting of GEDTA, BAPTA, and DTPA, may be used in combination.

In cases where the non-aqueous ink-jet ink composition contains anionic pigment, such as a lake pigment, since the typical metallic element ion is apt to separate out, it is efficient to employ the crown ether and/or the cryptand acting as the neutral carrier, which suffers from little change in structure before the crown ether and/or the cryptand captures the typical metallic element ion and after the crown ether and/or the cryptand has captured the typical metallic element ion, and which is therefore advantageous from the view point of entropy. In cases where the non-aqueous ink-jet ink composition does not contain the lake pigment, and the typical metallic element ion originates from only the vessel and the ink path, besides the use of the crown ether and/or the cryptand acting as the neutral carrier, only GEDTA, BAPTA, or DTPA acting as the ionic carrier, which has a low solubility in the organic solvent may be used. Specifically, in cases where a comparatively large amount of the typical metallic element ion separates out into the ink composition, the crown ether and/or the cryptand acting as the neutral carrier may be used. Also, in cases where the amount of the typical metallic element ion separating out into the ink composition is small, GEDTA, BAPTA, or DTPA acting as the ionic carrier may be used alone. Alternatively, in cases where the amount of the typical metallic element ion separating out into the ink composition is small, the crown ether and/or the cryptand acting as the neutral carrier may be used.

The lake pigment is produced with a technique, in which various dyes soluble in water are precipitated as water-insoluble fine particles by use of metal salts or other precipitants. The kind of the typical metallic element ion dissolving into the ink composition varies for different kinds of the lake pigments. Therefore, in the cases of the non-aqueous ink-jet ink composition containing the lake pigment, it is efficient to use a chelating agent that is capable of undergoing chelation with the typical metallic element ion, which dissolves into the non-aqueous ink-jet ink composition. Also, in such cases, since a large amount of calcium ion is contained as the impurity of the pigment, it is efficient to use a chelating agent, which is capable of capturing the calcium ion, together with the chelating agent that is capable of undergoing chelation with the typical metallic element ion, which dissolves into the non-aqueous ink-jet ink composition. The crown ether and the cryptand is capable of selectively recognizing the metal ion, which has a size adapted to the hole diameter of the crown ring. With respect to the calcium ion, 4,13-diazo-18-crown-6-ether and its derivatives are appropriate.

The proportion of the chelating agent used should preferably be at least 0.01% by weight with respect to the total amount of the ink composition, and should more preferably fall within the range of 0.03% by weight to 0.50% by weight with respect to the total amount of the ink composition. The proportion of the chelating agent used depends upon the amount of the metal ion to be captured. In cases where the proportion of the chelating agent used is at least 0.03% by weight with respect to the total amount of the ink composition, the metal ion originating from the pigment and the ink flow path is capable of being captured sufficiently. The upper limit of the proportion of the chelating agent used depends upon the solubility of the chelating agent in the solvent used. In cases where the cost is taken into consideration, it will be excessive to use the chelating agent in a proportion larger than 0.50% by weight with respect to the total amount of the ink composition. GEDTA, BAPTA, or DTPA may be used in a proportion falling within a range of saturation.

In the non-aqueous ink-jet ink composition in accordance with the present invention, the chelating agent for the typical metallic element ion is soluble in the solvent. Specifically, the chelating agent is soluble in the solvent to an extent such that the chelating agent is capable of capturing the typical metallic element ion, which has dissolved into the non-aqueous ink-jet ink composition. The solvent may be selected appropriately from polar organic solvents and non-polar organic solvents.

As the polar organic solvents, it is possible to use ester types of solvents, alcohol types of solvents, higher fatty acid types of solvents, ether types of solvents, or mixed solvents containing the above-enumerated solvents. The polar organic solvents are selected from the polar organic solvents, which form a single phase when being mixed with solvents other than the polar organic solvents.

Specifically, examples of the polar organic solvents include ester types of solvents, such as methyl laurate, isopropyl laurate, isopropyl myristate, isopropyl palmitate, isostearylpalmitate, methyl oleate, ethyl oleate, isopropyl oleate, butyl oleate, methyl linoleate, isobutyl linoleate, ethyl linoleate, isopropyl isostearate, a soybean oil methyl ester, a soybean oil isobutyl ester, a tall oil methyl ester, a tall oil isobutyl ester, diisopropyl adipate, diisopropyl sebacate, diethyl sebacate, propylene glycol monocaprate, trimethylolpropane tri-2-ethyl hexanoate, and glyceryl tri-2-ethyl hexanoate; alcohol types of solvents, such as isomyristyl alcohol, isopalmityl alcohol, isostearyl alcohol, and oleyl alcohol; higher fatty acid types of solvents, such as isononanoic acid, isomyristic acid, hexadecanoic acid, isopalmitic acid, oleic acid, and isostearic acid; and ether types of solvents, such as a diethylene glycol monobutyl ether, an ethylene glycol monobutyl ether, a propylene glycol monobutyl ether, and a propylene glycol dibutyl ether.

Examples of the solvents other than the polar organic solvents, which may be contained in the solvents, include non-polar solvents, such as aliphatic hydrocarbon solvents and aromatic hydrocarbon solvents. Examples of the preferable aliphatic hydrocarbon solvents include Teclean N-16, Teclean N-20, Teclean N-22, Nisseki Naphtesol L, Nisseki Naphtesol M, Nisseki Naphtesol H, Solvent 0 L, Solvent 0 M, Solvent 0 H, Nisseki Isosol 300, Nisseki Isosol 400, AF-4, Af-5, AF-6, and AF-7, supplied by Nippon Oil Corporation; and Isopar G, Isopar H, Isopar L, Isopar M, Exxol D40, Exxol D80, Exxol D100, Exxol D130, and Exxol D140. Examples of the preferable aromatic hydrocarbon solvents include Cleansol G (an alkyl benzene), supplied by Nippon Oil Corporation.

Examples of the dispersing agents, which may be contained in the non-aqueous ink-jet ink composition in accordance with the present invention, include a hydroxyl group-containing carboxylic acid ester, a salt of a long-chain polyaminoamide and a high-molecular weight acid ester, a salt of a high-molecular weight polycarboxylic acid, a salt of a long-chain polyaminoamide and a polar acid ester, a high-molecular weight unsaturated acid ester, a high-molecular weight copolymer, a modified polyurethane, a modified polyacrylate, a polyether ester type of anionic surface active agent, a naphthalenesulfonic acid-formalin condensate salt, an aromatic sulfonic acid-formalin condensate salt, a polyoxyethylene alkyl phosphoric acid ester, a polyoxyethylene nonyl phenyl ether, a polyester polyamine, and stearylamine acetate.

Specifically, examples of the dispersing agents include "Anti-Terra-U (a polyaminoamide phosphoric acid salt)," "Anti-Terra-203/204 (a high-molecular weight polycarboxylic acid salt)," "Disperbyk-101 (a polyaminoamide phosphoric acid salt and an acid ester), 107 (a hydroxyl group-containing carboxylic acid ester), 110 (a copolymer containing an acid group), 130 (a polyamide), 161, 162, 163, 164, 165, 166, 170 (a high-molecular weight copolymer)," "400," "Bykumen (a high-molecular weight unsaturated acid ester)," "BYK-P104, P105 (a high-molecular weight unsaturated acid polycarboxylic acid)," "P104S, 240S (a high-molecular weight unsaturated acid polycarboxylic acid and a silicon type)," and "Lactimon (a long-chain amine, an unsaturated acid polycarboxylic acid, and silicon)," supplied by BYK Chemie Co.

Also, specifically, examples of the dispersing agents include "Efka 44, 46, 47, 48, 49, 54, 63, 64, 65, 66, 71, 701, 764, and 766," and "Efka Polymer 100 (a modified polyacrylate), 150 (an aliphatic type of modified polymer), 400, 401, 402, 403, 450, 451, 452, 453 (a modified polyacrylate), and 745 (a copper phthalocyanine type)," supplied by Efka CHEMICALS Co.; and "Flowlen TG-710 (a urethane oligomer)," "Flowlen DOPA-15B (an acryl oligomer)," "Flowlen SH-290, SP-1000," and "Polyflow No. 50E, No. 300 (an acryl type of copolymer)", "supplied by Kyoeisha Chemicals Co., Ltd.; and "Disparlon KS-860, 873SN, 874 (a high-molecular weight dispersing agent), #2150 (an aliphatic polyhydric carboxylic acid), #7004 (a polyether ester type)," and "DA-703-50 (a polyester acid amide amine salt," supplied by Kusumoto Chemicals, Ltd.

Further, specifically, examples of the dispersing agents include "Demol RN, N (a naphthalenesulfonic acid-formalin condensate sodium salt), MS.C, SN—B (an aromatic sulfonic acid-formalin condensate sodium salt), EP," "Homogenol L-18 (a polycarboxylic acid type of polymer)," "Emulgen 920, 930, 931, 935, 950, 985 (a polyoxyethylene nonyl phenyl ether)," "Acetamin 24 (coconut amine acetate), 86 (stearylamine acetate)," supplied by Kao Corp.; "Solsperse 5000 (a phthalocyanine ammonium salt type), 13940 (a polyester amine type), 17000, 18000 (a fatty acid amine type), 22000, 24000, 28000," supplied by Lubrizol Co.; and "Nikkol T106 (a polyoxyethylene sorbitan monooleate), MYS-IEX (a polyoxyethylene monostearate), Hexaglyn 4-0 (hexaglyceryl tetraoleate)," supplied by Nikko Chemicals Co., Ltd.

Among the combinations of the solvents and the dispersing agents enumerated above, the combination of the ester type of the solvent and the dispersing agent having the ester structure, particularly the dispersing agent having the polyester amine structure or the fatty acid amine structure, is more preferable for obtaining an ink composition having better dispersion stability, i.e. a stable ink composition in which the pigment has fine particle diameters, and in which little alteration of the particle diameters and the viscosity occurs when the ink composition is left to stand at high temperatures. The ester type of the solvent should preferably be contained in a proportion of at least 10% by weight in the polar organic solvent. In order for the dispersibility of the pigment in the ink composition to be enhanced, the ester type of the solvent should more preferably be contained in a proportion of at least 30% by weight in the polar organic solvent, and should most preferably be contained in a proportion of at least 50% by weight in the polar organic solvent.

As the pigments, inorganic pigments and organic pigments, which are ordinarily used in the field of printing technology, may be used. Examples of the pigments include carbon black, cadmium red, molybdenum red, chrome yellow, cadmium yellow, titanium yellow, chromium oxide, viridian, cobalt green, ultramarine blue, Prussian blue, cobalt blue, phthalocyanine types of pigments, quinacridone types of pigments, isoindolenone types of pigments, dioxazine types of pigments, threne types of pigments, perylene types of pigments, perinone types of pigments, thioindigo types of pigments, quinophthalone types of pigments, and metal complex pigments.

Also, various lake pigments may be used. Examples of the lake pigments include insoluble azo pigments, such as β-naphthol types, naphthol AS types, acetoacetic anilide types, and pyrazolone types (e.g., Disazo Yellow and Lake Red 4R); soluble azo pigments, such as Ca lake, Ba lake, Sr lake, and Mn lake (e.g., Brilliant Carmine 6B, Lake Red C, and Watchung Red); basic lake pigments, such as tannic acid lake, phosphorus molybdate lake, phosphorus wolframate lake, and phosphorus molybdenum wolframate lake (e.g., Rhodamine B Lake, Rhodamine 6G Lake, and Methyl violet Lake); and acid lake pigments, such as Ba lake, Ca lake, Al lake, and Pb lake (e.g., Orange II Lake and Quyinoline Yellow Lake).

Each of the above-enumerated pigments may be used alone. Alternatively, two or more of the above-enumerated pigments may be used in combination. The proportion of the pigment should preferably fall within the range of 0.01% by mass to 20% by mass with respect to the total amount of the ink composition.

Besides the pigment, the diluting solvent, and the dispersing agent, a resin soluble in the polar organic solvent may be contained in the non-aqueous ink-jet ink composition in accordance with the present invention, such that the adhesion of the ink composition to the recording medium may be enhanced, or such that the spread of dots of the ink composition on the recording medium may be adjusted. Examples of the resins include acrylic resins, styrene-acrylic resins, styrene-maleic acid types of resins, rosin types of resins, rosin ester types of resins, ethylene-vinyl acetate types of resins, petroleum resins, cumarone-indene types of resins, terpene phenol types of resins, phenol resins, urethane resins, melamine resins, urea resins, epoxytypes of resins, cellulose types of resins, vinyl chloride acetate types of resins, xylene resins, alkyd resins, aliphatic hydrocarbon resins, butyral resins, maleic acid resins, and fumaric acid resins.

The present invention will further be illustrated by the following non-limitative examples. In the examples described below, the chelating agent was solubilized in part of the solvent used and was thus added. However, no limitation is imposed upon how the chelating agent is added. For example, the chelating agent may be dissolved in a volatile solvent, such as methanol or ethanol, and may thus be added. Also, the addition of the chelating agent may be performed at the time of premixing or after the preparation of the ink composition.

EXAMPLES

Example 1

Firstly, 13.7 parts by weight of a soybean oil methyl ester, 20.0 parts by weight of a soybean oil butyl ester, 10.0 parts by weight of oleyl alcohol, 17.0 parts by weight of a naphthene type of solvent (AF-4, supplied by Nippon Oil Corporation), and 15.0 parts by weight of a naphthene type of solvent (AF-6, supplied by Nippon Oil Corporation) were mixed together. Thereafter, 5.0 parts by weight of Solsperse 13940 (supplied by Lubrizol Co.) were dissolved as a dispersing agent in the resulting mixture. Also, 9.0 parts by weight of Brilliant Carmine 6B (supplied by Dainippon Ink and Chemicals, Inc.: C. I. Name Pigment Red 57:1) were added, and the resulting mixture was premixed. Thereafter, a dispersing process was performed with a bead mill for a residence time of approximately 20 minutes. In this manner, an ink composition was prepared. Further, 0.3 part by weight of 4,13-diaza-18-crown-6-ether (a reagent, supplied by Tokyo Kasei Kogyo K.K.) was dissolved under heating in 10.0 parts by weight of ethyl oleate, and 10.3 parts by weight of the thus obtained chelating agent solution were added to the thus prepared ink composition. In this manner, a desired ink composition was prepared.

Example 2 to Example 8

In each of Example 2 to Example 8, an ink composition was prepared in the same manner as that in Example 1, except that the pigment, the solvent, the dispersing agent, and the chelating agent listed in Table 1 below were used in the amount listed in Table 1.

Comparative Example 1 to Comparative Example 3

In each of Comparative Example 1, Comparative Example 2, and Comparative Example 3, an ink composition was prepared in the same manner as that in Example 1, except that the pigment, the solvent, the dispersing agent, and the chelating agent listed in Table 2 below were used in the amount listed in Table 2.

(Evaluation Methods)

Storage Stability

The ink composition was accommodated in an enclosed vessel and left to stand for three months under an environmental condition of 70° C. Thereafter, alterations of the particle size and the viscosity of the ink composition were measured. Results of the measurement were evaluated with the rating shown below. The particle size of the ink composition was measured with a dynamic light scattering type of particle diameter distribution apparatus (LB-500, supplied by Horiba Seisakusho K.K.). Also, the viscosity of the ink composition was measured with HAAKE Rheometer RS75. The rate of alteration of each of the particle size and the viscosity of the ink composition was calculated with the formula shown below.

[(value after three months×100)/(initial value)]−100 (%)

◯: The rate of alteration of the particle size or the viscosity was less than 5%.

Δ: The rate of alteration of the particle size or the viscosity fell within the range of 5% to less than 10%.

×: The rate of alteration of the particle size or the viscosity was at least 10%.

Amount of Sediments

The ink composition was accommodated in an enclosed vessel and left to stand for one month under an environmental condition of 70° C. Thereafter, the ink composition was caused to pass through a #2000-mesh metal filter, and the amount of residue product remaining on the metal filter was visually inspected and evaluated with the rating described below.

◯: The residue product was not present.

Δ: The residue product remained slightly.

×: A large amount of the residue product remained.

Jetting-Out Stability

The ink composition was jetted out from an ink jet printer head (supplied by Xaar Co.), and the jetting-out stability was evaluated with the rating described below.

◯: A stable jetting-out condition was obtained.

Δ: The jetting-out condition became unstable during continuous jetting-out operation.

×: Fly bending occurred from the initial stage.

The ink composition prepared in each of Examples 1 to Examples 8 and Comparative Example 1 to Comparative Example 3 was evaluated with the evaluation methods described above. Results listed in Table 1 and Table 2 were obtained. Of the pigments listed in Table 1 and Table 2, Brilliant Carmine 6B is the lake pigment having the characteristics such that Ca is apt to dissolve as the typical metallic element ion into the ink composition. Permanent Red is the lake pigment having the characteristics such that Sr is apt to dissolve as the typical metallic element ion into the ink composition. Lithol Red is the lake pigment having the characteristics such that Na and Ba are apt to dissolve as the typical metallic element ions into the ink composition. Also, 4,13-diaza-18-crown-6-ether is the chelating agent apt to capture Ca. Benzo-18-crown-6-ether is the chelating agent apt to capture Sr. Cryptand [2.2.2] is the chelating agent apt to capture Na and Ba.

TABLE 1

|  |  | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- | --- |
| Pigment | Brilliant Carmine 6B (Pigment Red 57:1) | 9.00 | 9.00 |  |  |  |  |  |  |
|  | Permanent Red 2B (Pigment Red 48:3) |  |  | 9.00 | 9.00 |  |  |  |  |
|  | Lithol Red (Pigment Red 49:1) |  |  |  |  | 9.00 |  |  |  |
|  | Carbon black (MA-8) |  |  |  |  |  | 9.00 | 9.00 | 9.00 |
| Polar solvent | Soybean oil methyl ester (ester type solvent) | 13.70 | 13.00 |  |  | 5.00 | 10.95 | 9.97 | 9.99 |
|  | Soybean oil isobutyl ester (ester type solvent) | 20.00 | 20.00 | 35.00 | 35.00 |  | 45.00 | 45.00 | 45.00 |
|  | Ethyl oleate (ester type solvent) | 10.00 | 10.00 | 15.00 | 15.00 |  |  |  |  |
|  | Diethylene glycol monobutyl ether |  |  |  |  |  |  |  |  |
|  | Oleyl alcohol | 10.00 | 10.00 |  |  | 15.70 |  |  |  |
|  | Isostearyl alcohol |  |  | 10.00 | 10.00 |  | 10.00 | 11.00 | 11.00 |
| Non-polar solvent | AF-4 (naphthene type solvent, supplied by Nippon Oil Corporation) | 17.00 | 17.00 |  |  | 45.00 | 20.00 | 20.00 | 20.00 |
|  | AF-6 (naphthene type solvent, supplied by Nippon Oil Corporation) | 15.00 | 15.95 | 15.00 | 15.00 | 15.00 |  |  |  |
|  | Isosol 400 (isoparafin type solvent, supplied by Nippon Oil Corporation) |  |  | 10.70 | 10.70 |  |  |  |  |
|  | Exxol D80 (aliphatic hydrocarbon type solvent, |  |  |  |  | 5.00 |  |  |  |
| Dispersing agent | Solsperse 13940 | 5.00 | 5.00 | 5.00 | 5.00 | 5.00 |  |  |  |
|  | Solsperse 18000 |  |  |  |  |  | 5.00 | 5.00 | 5.00 |
| Chelating agent | 4,13-Diaza-18-crown-6-ether (reagent, supplied by Tokyo Kasei Kogyo K.K.) | 0.30 | 0.05 | 0.05 |  | 0.05 | 0.05 |  |  |
|  | Benzo-18-crown-6-ether (reagent, supplied by Tokyo Kasei Kogyo K.K.) |  |  | 0.25 | 0.30 |  |  |  |  |
|  | Cryptand [2.2.2] (reagent, supplied by Tokyo Kasei Kogyo K.K.) |  |  |  |  | 0.25 |  |  |  |
|  | GEDTA (reagent, supplied by Dojindo Laboratories) |  |  |  |  |  |  | 0.03 |  |
|  | BAPTA (reagent, supplied by Tokyo Kasei Kogyo K.K.) |  |  |  |  |  |  |  | 0.01 |
|  | EDTA2NA (reagent, supplied by Tokyo Kasei Kogyo K.K.) |  |  |  |  |  |  |  |  |
|  | Ethyl acetoacetate (reagent, supplied by Tokyo Kasei Kogyo K.K.) |  |  |  |  |  |  |  |  |
|  | Total | 100.0 | 100.0 | 100.0 | 100.0 | 100.0 | 100.0 | 100.0 | 100.0 |
|  | Storage stability | ◯ | ◯ | ◯ | ◯ | ◯ | ◯ | ◯ | ◯ |
|  | Amount of sediments | ◯ | Δ | ◯ | Δ | ◯ | ◯ | ◯ | ◯ |
|  | Jetting-out stability | ◯ | ◯ | ◯ | ◯ | ◯ | ◯ | ◯ | ◯ |

TABLE 2

| | | Comp. Ex. | Comp. Ex. | Comp. Ex. |
|---|---|---|---|---|
| Pigment | Brilliant Carmine 6B (Pigment Red 57:1) | 9.00 | | |
| | Permanent Red 2B (Pigment Red 48:3) | | 9.00 | |
| | Lithol Red (Pigment Red 49:1) | | | |
| | Carbon black (MA-8) | | | 9.00 |
| Polar solvent | Soybean oil methyl ester (ester type solvent) | 13.70 | | 10.00 |
| | Soybean oil isobutyl ester (ester type solvent) | 20.00 | 35.00 | 45.00 |
| | Ethyl oleate (ester type solvent) | 10.00 | 15.00 | |
| | Diethylene glycol monobutyl ether | | | |
| | Oleyl alcohol | 10.00 | | |
| | Isostearyl alcohol | | 10.00 | 11.00 |
| Non-polar solvent | AF-4 (naphthene type solvent, supplied by Nippon Oil Corporation) | 17.00 | | 20.00 |
| | AF-6 (naphthene type solvent, supplied by Nippon Oil Corporation) | 15.00 | 15.00 | |
| | Isosol 400 (isoparafin type solvent, supplied by Nippon Oil Corporation) | | 10.70 | |
| | Exxol D80 (aliphatic hydrocarbon type solvent, | | | |
| Dispersing agent | Solsperse 13940 | 5.00 | 5.00 | |
| | Solsperse 18000 | | | 5.00 |
| Chelating agent | 4,13-Diaza-18-crown-6-ether (reagent, supplied by Tokyo Kasei Kogyo K.K.) | | | |
| | Benzo-18-crown-6-ether (reagent, supplied by Tokyo Kasei Kogyo K.K.) | | | |
| | Cryptand [2.2.2] (reagent, supplied by Tokyo Kasei Kogyo K.K.) | | | |
| | GEDTA (reagent, supplied by Dojindo Laboratories) | | | |
| | BAPTA (reagent, supplied by Tokyo Kasei Kogyo K.K.) | | | |
| | EDTA2NA (reagent, supplied by Tokyo Kasei Kogyo K.K.) | 0.30 | | |
| | Ethyl acetoacetate (reagent, supplied by Tokyo Kasei Kogyo K.K.) | | 0.30 | |
| | Total | 100.00 | 100.00 | 100.00 |
| | Storage stability | — | — | ○ |
| | Amount of sediments | — | — | x |
| | Jet stability | — | — | Δ |

Each of the ink compositions prepared in Examples 1 to 5 contained the lake pigment. In the cases of each of the ink compositions prepared in Examples 1 to 5, it was confirmed that the typical metallic element ion having separated out from the pigment was captured by the chelating agent acting as the neutral carrier, such as the crown ether or the cryptand. Also, in the cases of each of the ink compositions prepared in Examples 1 to 5, as clear from the amount of sediments, it was confirmed that the typical metallic element ion chelate having been formed became soluble in the non-aqueous ink composition and remained stable in the soluble state. In the cases of the ink composition prepared in Example 2, since the amount of the chelating agent added was slightly small, markedly slight occurrence of sediments was seen. In the cases of the ink composition prepared in Example 4, which did not contain the chelating agent for capturing Ca, markedly slight occurrence of sediments was seen.

Each of the ink compositions prepared in Examples 6 to 8 did not contain the lake pigment. In the cases of each of the ink compositions prepared in Examples 6 to 8, the metallic element ion was capable of being captured sufficiently by use of only GEDTA or BAPTA acting as the ionic carrier having a low solubility in the organic solvent (a sufficient effect of capturing the metallic element ion was also obtained by use of the chelating agent acting as the neutral carrier, such as the crown ether or the cryptand).

In the cases of each of the ink compositions prepared in Comparative Examples 1 and 2, since the chelating agent was not soluble in the solvent, the occurrence of sediments with the passage of time could not be suppressed. In the cases of the ink composition prepared in Comparative Example 3, which did not contain the chelating agent, the occurrence of sediments with the passage of time could not be suppressed.

As described above, the non-aqueous ink-jet ink composition in accordance with the present invention contains at least the pigment, the solvent, and the dispersing agent. The non-aqueous ink-jet ink composition in accordance with the present invention further contains the chelating agent, which is soluble in the solvent. Therefore, with the non-aqueous ink-jet ink composition in accordance with the present invention, the chelating agent is capable of capturing the typical metallic element ion, which originates from pigments, pigment derivatives, impurities contained at the time of pigment synthesis, the vessel, and the ink path. Also, the typical metallic element ion chelate constitutes a solvate together with the typical metallic element ion. Therefore, the problems do not occur in that the typical metallic element ion separates out into the ink composition. Accordingly, the occurrence of sediments with the passage of time is capable of being suppressed. As a result, the non-aqueous ink-jet ink composition in accordance with the present invention is capable of having good storage stability and good jetting-out performance.

What is claimed is:

1. A non-aqueous ink-jet ink composition, which contains at least a pigment, a solvent, and a dispersing agent, wherein the non-aqueous ink-jet composition further contains a chelating agent, which chelating agent is a crown ether and/or a cryptand and is soluble in the solvent.

* * * * *

UNITED STATES PATENT AND TRADEMARK OFFICE
CERTIFICATE OF CORRECTION

PATENT NO. : 7,288,144 B2
APPLICATION NO. : 11/101769
DATED : October 30, 2007
INVENTOR(S) : Shunsuke Uozumi and Yasuo Yamamoto Page 1 of 1

It is certified that error appears in the above-identified patent and that said Letters Patent is hereby corrected as shown below:

ON THE COVER PAGE

Under (73) Assignees:

Please insert

-- Riso Kagaku Corporation,
5-34-7, Shiba Minato-ku,
Tokyo, Japan --.

Signed and Sealed this

Second Day of September, 2008

JON W. DUDAS
*Director of the United States Patent and Trademark Office*